(12) United States Patent
Zametzky

(10) Patent No.: US 6,674,659 B2
(45) Date of Patent: Jan. 6, 2004

(54) SWITCHING VOLTAGE CONVERTER

(75) Inventor: Klaus Zametzky, Fürth (DE)

(73) Assignee: Semikron Elektronik GmbH, Nuremberg (DE)

(*) Notice: Subject to any disclaimer, the term of this patent is extended or adjusted under 35 U.S.C. 154(b) by 32 days.

(21) Appl. No.: 10/096,320

(22) Filed: Mar. 12, 2002

(65) Prior Publication Data
US 2002/0136040 A1 Sep. 26, 2002

(30) Foreign Application Priority Data

Mar. 13, 2001 (DE) .......................... 101 11 912
Feb. 13, 2002 (DE) .......................... 102 05 833

(51) Int. Cl.$^7$ .......................................... H02M 7/5387
(52) U.S. Cl. ..................... 363/132; 363/56.02
(58) Field of Search .................... 36/17, 24, 56.02, 36/132; 323/282, 285, 351

(56) References Cited

U.S. PATENT DOCUMENTS

| | | |
|---|---|---|
| 4,488,438 A | 12/1984 | Tomita |
| 4,967,109 A * | 10/1990 | Steigerwald ............. 327/434 |
| 6,304,066 B1 * | 10/2001 | Wilcox et al. ............ 323/282 |
| 6,330,172 B1 * | 12/2001 | Fontanella et al. ....... 363/56.02 |
| 6,570,343 B1 * | 5/2003 | Shoji et al. .............. 315/224 |
| 2002/0005748 A1 | 1/2002 | Inoue et al. |
| 2002/0131286 A1 | 9/2002 | Zametzky |

FOREIGN PATENT DOCUMENTS

| | | |
|---|---|---|
| DE | 33 11 662 A1 | 10/1983 |
| JP | 63-253720 | 10/1988 |
| JP | 02002330596 | * 11/2002 |

OTHER PUBLICATIONS

Tietz, Urlich and Schenck, Christoph, "Stromversorgung", Halbleiter–Schaltungstechnik, pp. 566–586, Edition 9, 1989, Berlin [u.a.] Germany.

Tietz, Ulrich and Schenck, Christoph, "Electronic Circuits: Design and Applications" pp. 507–525, 1991, Berlin, Germany (English translation of "Stromversorgung", pp. 566–586).

* cited by examiner

Primary Examiner—Adolf D. Berhane
(74) Attorney, Agent, or Firm—Darby & Darby

(57) ABSTRACT

A switching voltage converter in half bridge topology includes a control circuit for achieving a constant locking time for two power switches to switch between a TOP position and BOT position. The TOP switch is realized by one or more parallel-switched n-channel transistors and the BOT switch 3 is realized by one or more parallel-switched p-channel transistors. Both of the power switches are controlled by a gate driver. The reference potential of the gate driver is at the potential of the output signal $U_{out}$ of the half bridge. The driver is controlled by a switching-signal producing unit at the same reference potential as the driver 1, whereby unit and driver can be directly connected to each other.

4 Claims, 2 Drawing Sheets

SWITCHING VOLTAGE CONVERTER

BACKGROUND

The invention relates to switching voltage converters such as voltage transformers or rectifiers in half bridge topology. The general working principle of such switching voltage converters is based on a primary voltage which is chopped preferably BY electronic switches to obtain a desired AC voltage. This AC voltage is then suitably processed in a transformer and/or filter and/or rectifier to obtain an output voltage in the desired form and with desired characteristics.

The prior art includes switching voltage converters principles which use PWM (pulse width modulation). Such devices are disclosed, by Tietze/Schenk, chapter 18 (ISBN 3-540-19475-4, 9th edition). In such converters a half bridge topology feeds a transformer. The locking time between the power switch—typically n-channel transistors—in high and low conditions is varied to adjust the duty ratio of the chopped AC voltage. This results in a voltage or current of the desired characteristics at the output of the converter.

Mutually exclusive signals, also called one-hot signals, are defined here as two signals which are generated by the biasing of the pulse width modulator in a way that to prevent short circuits. In this technique, only one of the two switches is closed (is hot) at any given time.

There are also embodiments of converter principles in which the locking time between the two power switches of the half bridge is constant, as, for example, in the case of resonance converters. Resonance converters employ very high switching frequencies which reduces their switching power losses. They control the power to be transformed or its output voltage by varying the switching frequency. As a rule, this switching frequency is generated by a VCO (voltage controlled oscillator).

In prior-art embodiments, this VCO is at a quiescent potential. The switching signals generate by the VCO are transmitted via a suitable signal and potential separation to the power switches or their drivers. This arrangement is used mainly when the intermediate circuit voltage supply of the half bridge has a higher voltage than the associated oscillator circuit.

An example of the prior art is disclosed in DE 33 11 662, in which a circuit arrangement is used in an electromagnetic flowmeter. This circuit arrangement does not meet the requirements of the present invention, although it does introduce a half bridge arrangement with constant locking time.

Another example of the prior art is disclosed in Japanese patent JP 63253720, which introduces an arrangement in which the driver controls a half bridge consisting of an n-channel and a p-channel IGBT. This arrangement is provided with a reference potential of the gate driver which is not constant in time but equals the potential of the output voltage of the half bridge. By using an n-channel TOP switch and a p-channel BOT switch, both of which are jointly controlled by only one gate driver, a very short locking time and secure locking is achieved. The switching signal is transmitted to the driver via an optocoupler which takes over the task of signal or potential separation.

In the case of a resonance converter, comparatively high switching frequencies must be transmitted. For that reason, it is difficult and expensive to realize this signal or potential separation for the switching signal.

OBJECTS AND SUMMARY OF THE INVENTION

It is an object of the present invention to provide a switching voltage converter in a semi-bridge topology with constant locking time and low requirements in terms of switching technology for controlling the half bridge.

Briefly stated, the present invention provides a switching voltage converter in half bridge topology which includes a control circuit for achieving a constant locking time for two power switches to switch between a TOP position and BOT position. The TOP switch is realized by one or more parallel-switched n-channel transistors and the BOT switch 3 is realized by one or more parallel-switched p-channel transistors. Both of the power switches are controlled by a gate driver. The reference potential of the gate driver is at the potential of the output signal $U_{out}$ of the half bridge. The driver is controlled by a switching-signal producing unit at the same reference potential as the driver 1, whereby unit and driver can be directly connected to each other.

According to an embodiment of the invention, there is provided a awitching voltage converter in half bridge topology with a constant locking time between the a TOP switch and BOT switch, comprising: a control device, the TOP switch being at least one parallel-switched n-channel transistor, the BOT switch being at least one parallel-switched p-channel transistor, a gate driver controlling the TOP switch and the BOT switch, whereby both power switches are controlled by a gate driver, and a reference and supply voltage potential of the gate driver and the switching unit being for controlling the gate driver are at a common potential.

In the inventive solution, in contrast to the prior art, the circuit unit (oscillator circuit) producing the switching signal is chosen to receive the same potential as the supply potential or reference potential for the driver circuit. Thus, the oscillator circuit has no fixed reference potential. Instead, the reference potential of the oscillator and the gate driver varies with the output signal of the half bridge. This permits connecting the oscillator directly to the driver. A signal or potential separation carrying the signal is not necessary. For the control, only a quasi-static, i.e. slowly changing, control signal must be transmitted to the oscillator circuit. Thus, the transmitting component is subject to considerably less stringent switching requirements compared with the requirements for transmitting a higher-frequency switching signal of the oscillator circuit.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
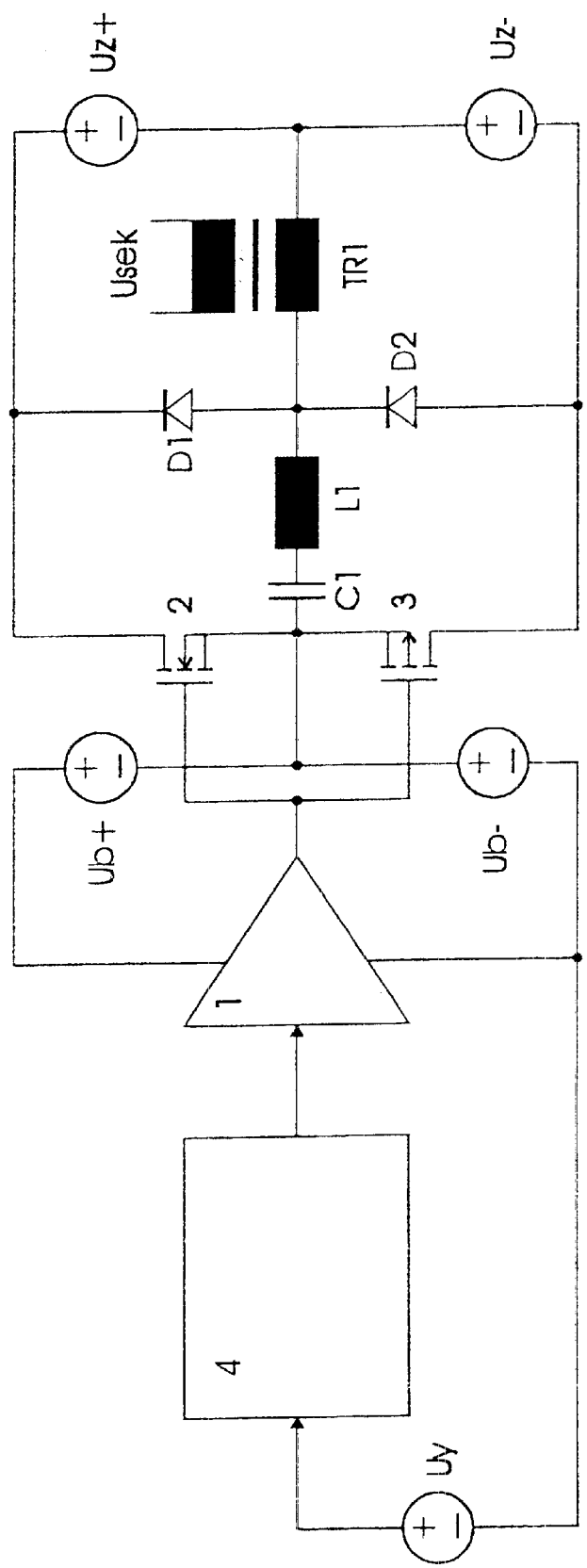
FIG. 1 is a resonance converter with a control circuit according to an embodiment of the invention.

Referring to FIG. 1, a VCO (voltage controlled oscillator) 4 generates a positive output voltage with a duty ratio of 50%. An external control variable, which can, for example, be transmitted by an optocoupler from the output circuit of the resonance converter, is shown in simplified form as a control voltage $U_y$. The output signal of the VCO 4 is applied directly to the input of the sole gate driver 1. A TOP switch 2 is an n-channel MOSFET. A BOT switch 3 is a p-channel MOSFET. This circuit arrangement ensures the mutually exclusive signals of the two switches through the circuit arrangement itself and not through an additional component. This is enforced since the output signal of the gate driver 1 can only switch through one of the two switches at a time. At high level, the TOP switch 2 is switched on and the BOT switch 3 is switched off. At low level, the BOT switch 3 is switched on, and the TOP switch 2 is switched off. Therefore, the reference potential of the gate driver depends on the switching states of the TOP and BOT switches.

Figure 2:
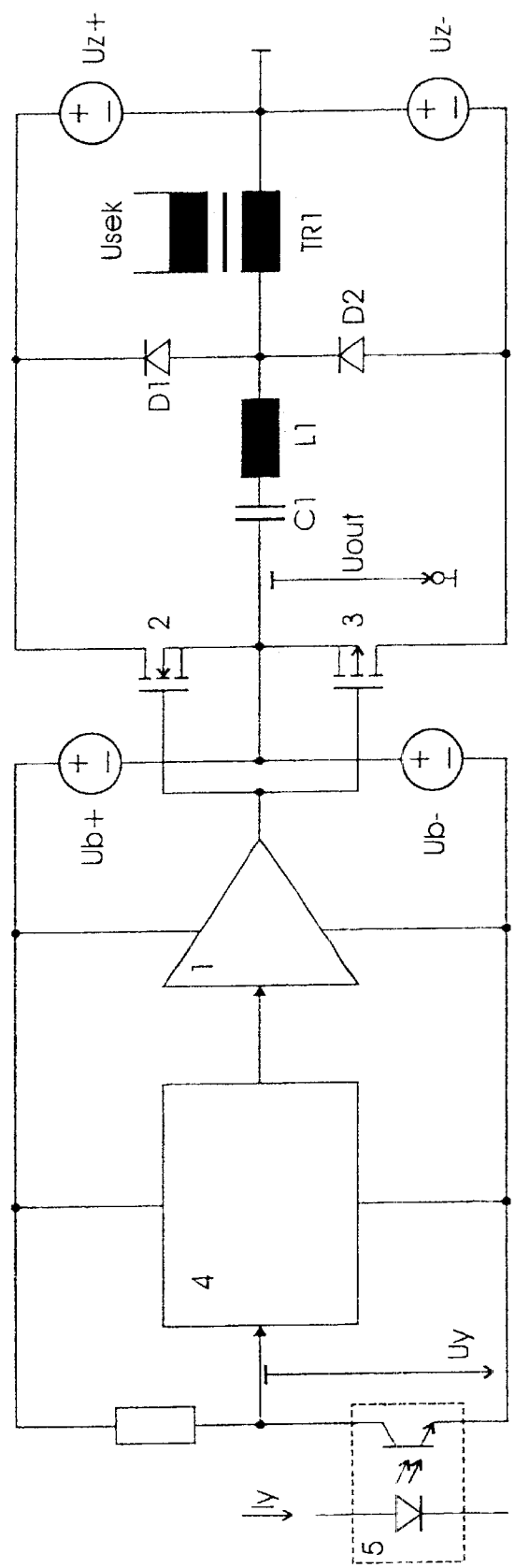
FIG. 2 is a detailed view of the resonance converter of FIG. 1.

Referring now to FIG. 2, the resonance converter from FIG. 1. The half bridge consists of an n-channel MOSFET as TOP switch 2 and a p-channel MOSFET as BOT switch 3. The resonance converter is fed from an intermediate-circuit voltage supply $U_{z+}/U_{z-}$. Both transistors are controlled by a gate driver 1 with a voltage supply of $U_{b+}/U_{b-}$. The gate driver receives switching signals from the voltage-controlled oscillator (VCO) 4, which is also fed by $U_{b+}$ and $U_{b-}$. It is of importance that the reference voltage level of the gate driver 1 and of the oscillator 4 (in this case, the junction of the voltage sources $U_{b+}$ and $U_{b-}$) is connected to the source connections of the power transistors. In this way, the electronic switches 2 and 3 are switched even when the intermediate circuit voltage $U_{z+}/U_{z-}$ is higher than the driver or oscillator supply voltage $U_{b+}/U_{b-}$. Since the VCO is at the same potential as the driver, the output of the VCO can be connected directly with the input of the driver, and the processing of higher switching frequencies therefore presents no problem.

The timing frequency of the VCO is set by a DC voltage $U_y$. $U_y$ is supplied by the optocoupler 5. In turn the control current $I_y$ affects $U_y$. $I_y$ and $U_y$ are very slow quasi-static signals in comparison with the switching signal. Therefore, a simple slow-acting optocoupler can be used, although the power supply is capable of operating with high switching frequencies. The switching frequency of the VCO and thus the current through the resonance circuit and therefore also the power transmitted via the transformer TR1 is adjustable by adjustment of $I_y$. The gate driver can have two static switching states:

1. a positive output voltage (high level) for controlling the TOP switch 2
2. a negative output voltage (low level) for controlling the BOT switch 3.

Since the gate driver 1 can have only two states (high or low level), these two conditions are achieved by switching the TOP switch 2 on at high level and, at the same time, by switching the BOT switch 3 off During a change to low level, the TOP switch 2 is switched off, since it falls below its shut-off threshold. As soon as the shut-off threshold of the BOT switch 3 is reached (low level), it is switched on, while the TOP switch 2 continues to be switched off. During a change from low level to high level, the BOT switch 3 is switched off first, since its input falls below its shut-off threshold (negative voltage). As soon as the shut-down threshold of the TOP switch 2 is reached (high level), it is switched on, while the BOT switch 3 continues to be switched off. Thus, it is ensured without any additional components that both switches cannot both be switched on at any time, which would produce a bridge short-circuit. The two switches have mutually exclusive signals due to the circuit design and not due to an additional component. Furthermore, the described method ensures that the time during which both switches are off is limited to the switching time of the gate driver.

Thus, by appropriately selecting $I_y$, the desired output voltage $U_{sec}$ can be generated on the secondary side of the transformer TR1.

In the circuit presented here, the reference potential of the gate driver and the VCO is at the potential of the output voltage of the half bridge. This means that the reference potential of the gate driver and the VCO varies, depending on the switching state of the half bridge. At high level the reference potential assumes a value of approximately $U_{z+}$, at low level it assumes a value of approximately $U_{z-}$. During the switching process between high and low or low and high level the reference potential of the driver and the VCO follows the output signal $U_{out}$.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A switching voltage converter in half bridge topology with a constant locking time between a TOP switch and a BOT switch, comprising:

a control device;

said TOP switch comprising at least one parallel-switched n-channel transistor;

said BOT switch comprising at least one parallel-switched p-channel transistor;

a gate driver controlling said TOP switch and said BOT switch;

wherein said control device controls said gate driver; and a reference voltage and a supply voltage for said gate driver and said control device are at a same potential of an output voltage of said half bridge, whereby said potential is varying during operation.

2. A switching voltage converter according to claim 1, wherein said reference voltage and said supply voltage being variable during operation depending on an output U out of said half bridge.

3. A switching voltage converter according to claim 1, wherein a potential-separating component carries a quasi-static control signal.

4. A switching voltage converter according to claim 1, wherein said switches are at least one of insulated gate bipolar transistors and MOSFETs.

* * * * *

UNITED STATES PATENT AND TRADEMARK OFFICE
CERTIFICATE OF CORRECTION

PATENT NO. : 6,674,659 B2
DATED : January 6, 2004
INVENTOR(S) : Klaus Zametzky

It is certified that error appears in the above-identified patent and that said Letters Patent is hereby corrected as shown below:

<u>Title page,</u>
Item [73], Assignee, delete "Semikron Elektronik GmbH, Nuremberg (DE)" and substitute -- Semikron Elektronik GmbH, Nurnberg (DE) --.

Signed and Sealed this

Fourth Day of May, 2004

JON W. DUDAS
*Acting Director of the United States Patent and Trademark Office*